Patented Apr. 22, 1930

1,755,844

UNITED STATES PATENT OFFICE

JOHN C. SLONNEGER, OF MILWAUKEE, WISCONSIN, ASSIGNOR TO MILWAUKEE POWER LAWN MOWER COMPANY, OF MILWAUKEE, WISCONSIN, A CORPORATION OF WISCONSIN

LAWN-MOWER DRIVE

Application filed November 21, 1927. Serial No. 234,701.

This invention relates to lawn mower drives.

The object of my invention is to provide a simple positive drive for the sickle bar of a power lawn mower whereby flexibility within a limited range is secured co-incident with positive connection so as to provide dependable transmission of motion for the upright parts of the mechanism.

More particularly stated, it is the object of my invention to provide a reciprocatory mechanism so linked to the sickle bar of a power lawn mower as to positively transmit reciprocatory motion to the sickle bar and yet provide resilient means in the connecting members whereby the sickle bar may be guided and yieldably pressed against the sickle guard.

In the drawings:—

Like parts are identified by the same reference characters in both views.

Figure 1:
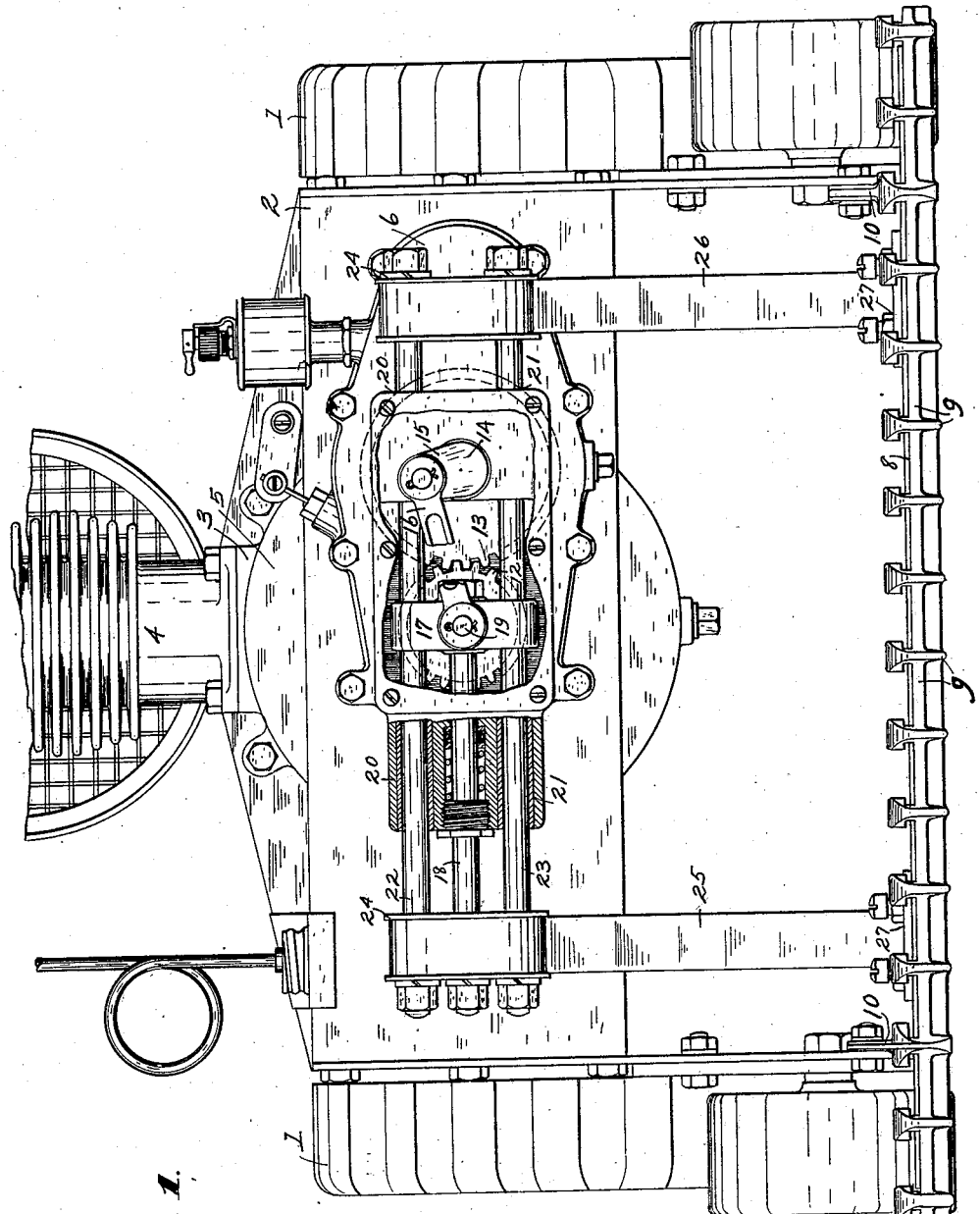
Figure 1 is a front view of a power lawn mower showing my improved drive mechanism.

It is of utmost importance in the operation of power lawn mowers having a sickle bar and a sickle guard for active cutting equipment to provide a driving mechanism for the sickle bar which will have incorporated in it elements providing positive reciprocatory mechanism for transmitting cutting motion to the sickle bar and also flexible members permitting the sickle bar to be resiliently guided and resiliently pressed against the sickle guard.

Obviously in a lawn mower to be used in parks and cemeteries where trimming comprises a large share of the work to be performed, it is important that the cutting means be situated in front of the mower mechanism generally and be so extensive as to cut grass in a swath at least as wide as the complete outer dimensions of the mower machine. I have, therefore, provided such a cutting mechanism in my power lawn mower and I have mounted it as follows:—

Two weight carrying traction wheels 1 support a frame 2 upon which is mounted a motor 3 with the usual cylinder 4 and crank case 5. At the anterior portion of this frame, I have provided an enclosed gear box 6 wherein the drive mechanism for transmitting rotary motion of the crank shaft 7 to the reciprocatory motion of the sickle bar 8 is mounted. This sickle bar 8 performs its work in co-operation with a sickle guard 9 which is carried at the extreme forward end of my entire power mower structure, by the forwardly extending portion of the frame at 10.

Within the gear case 6, a pinion 12, mounted on the crank shaft 7 co-acts with a gear 13 to provide the proper reduction in speed necessary between the rapidly revolving crank shaft 7 and the comparatively slowly reciprocating sickle bar 8, the gear 13 being mounted upon a shaft 14 provided with a crank arm 15 to which is pivotally secured a pitman 16. A cross head 17 secured to the end of the connecting rod 18 is provided with a stub shaft 19 which forms a pivotal connection between the cross head and the pitman 16.

Each side of the crank case 6 is provided with a pair of vertically disposed bearing members 20 and 21 for upper and lower guide rods 22 and 23 respectively and at each end of these guide rods I have provided a head 24 to which I have secured spring straps 25 and 26 which extends forwardly and downwardly to a point of connection at 27 with the sickle bar 8.

Figure 2:
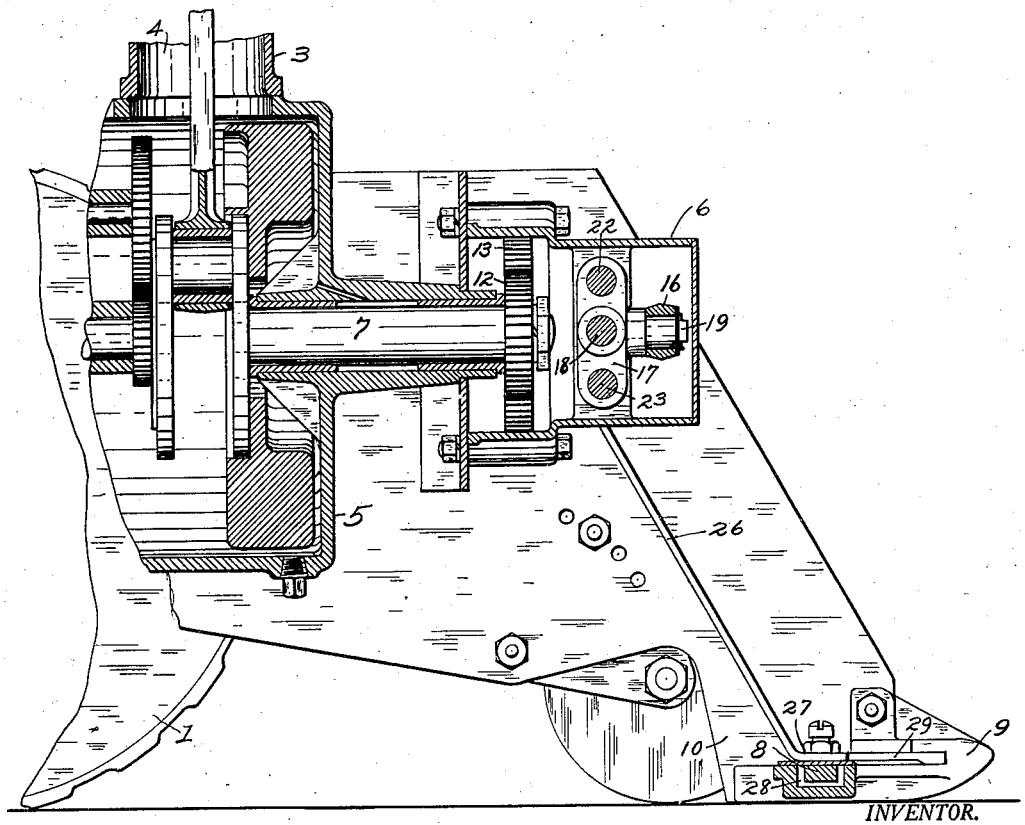
Figure 2 is a side view of the front portion of a lawn mower equipped with my device.

It will be noted upon examination of Figure 2 that the sickle bar 8 is very loosely mounted for reciprocation upon sickle guard 9, there being substantial clearance at 27 and at 28 to enable the sickle bar freedom of motion when obstructions or heavy cutting are encountered.

In operation my device functions as follows:—rotary motion of the crank shaft 7 is transmitted through the pinion 12 and the gear 13 to the crank 15 which with its pitman connection 16 translates this rotary motion into reciprocatory motion of the cross head 17. This cross head is free to move upon the guide rodes 22 and 23 but is secured tightly to the end of the connecting rod 18. Through the head 24, however, this reciprocatory movement of the connecting rod 18 is transmitted to the guide rods 22 and 23 so that the head 24 at the other end of the guide rods is rigidly connected with the head 24 secured at the end of the connecting rod 18. The spring straps 25 and 26, therefore, secured to the heads 24 move together to provide movement to the sickle bar. These spring straps 25 and 26 are flexible only in an upward and downward direction since they are of substantial width and only moderate thickness. The power developed by the motor therefore is positively exerted in reciprocation of the sickle bar at the same time permitting flexure when thick grass, sticks or wire compel the sickle bar to move upwardly out of immediate contact with the sickle guard 9.

I have, therefore, provided the power connection for the sickle bar which combines not only the positive motion necessary to the operation of my cutting mechanism but also incorporates sufficient resilience to yield in times of stress so as to prevent injury to the sickle bar 8.

It will likewise be noted that by reason of the particular construction shown in the drawings my device is adapted to accomplish its best results when heavy growth of grass is encountered. Heavier pressure against the points or cutting edges of the sickle bar will cause the sickle bar to be pressed backwardly against the spring straps 25 and 26 and the additional spring pressure induced thereby will cause the sickle bar to bear down tightly against the shear portions of the sickle guard, thereby improving the cutting and shearing action between the sickle guard and the sickle bar.

I claim:

1. A power mower provided with a sickle guard and sickle bar, power means providing reciprocating motion and a spring strap connection between the power means and the sickle bar, said spring strap providing directional and pressure means for moving the sickle bar with reference to the sickle guard.

2. A power mower provided with a sickle guard and sickle bar, power means providing reciprocating motion, and a spring strap connection between the power means and the sickle bar whereby the bar is guided and reciprocated.

3. In a power mower provided with a sickle guard and sickle bar, a motor providing rotative power, means for converting rotary motion of the motor into reciprocatory motion, a guide rod for receiving the reciprocatory motion and a spring strap between the guide rod and the sickle bar to provide means of guiding and reciprocating said bar.

4. In a power mower provided with a sickle guard and sickle bar, a motor, connection between the motor and the sickle bar to provide reciprocatory motion for the bar and to provide resilient directional pressure of the sickle bar against the guard.

5. A power mower comprising a motor, connections therewith to provide reciprocatory motion, a sickle bar and sickle guard for operative co-action and spring straps between the connections and the sickle bar whereby the bar is resiliently pressed against the guard and reciprocatory motion is imparted to the bar.

JOHN C. SLONNEGER.